United States Patent
Bonicel

[19]

[11] Patent Number: 5,982,966
[45] Date of Patent: Nov. 9, 1999

[54] ASYMMETRIC STRUCTURE FIBER OPTIC CABLE

[75] Inventor: Jean-Pierre Bonicel, Rueil Malmaison, France

[73] Assignee: Alcatel, Paris, France

[21] Appl. No.: 08/993,692

[22] Filed: Dec. 18, 1997

[30] Foreign Application Priority Data

Dec. 19, 1996 [FR] France .................................. 96 15637

[51] Int. Cl.⁶ ...................................................... G02B 6/44
[52] U.S. Cl. .............................................................. 385/100
[58] Field of Search ................................ 385/100–105, 385/147

[56] References Cited

U.S. PATENT DOCUMENTS 4,488,040  12/1984  Rowe ...................................... 385/100
4,950,047   8/1990  Berkey et al. .......................... 385/100
5,448,670   9/1995  Blew et al. ............................. 385/112
5,602,953   2/1997  Delage et al. .......................... 385/101

FOREIGN PATENT DOCUMENTS

0240165A1   10/1987   European Pat. Off. .
3232108A1    3/1984   Germany .
  9615466     5/1996   WIPO .
WO9615466    5/1996   WIPO .

*Primary Examiner*—Akm E. Ullah
*Attorney, Agent, or Firm*—Sughrue, Mion, Zinn, Macpeak & Seas, PLLC

[57] ABSTRACT

A fiber optic cable comprises, in a sheath, a tube in which the optical fibers are disposed and a single reinforcing member. These components are arranged so that the neutral axis of the tube and that of the cable coincide.

10 Claims, 1 Drawing Sheet

ASYMMETRIC STRUCTURE FIBER OPTIC CABLE

BACKGROUND OF THE INVENTION

1. Field of the invention

The present invention concerns a cable comprising a small number of optical fibers that has a very simple structure and consequently is very economic to manufacture.

Cables of this kind comprise, inside a sheath, a single reinforcing member and generally a single housing such as a tube in which the optical fibers are disposed. The sheath is extruded over the tube and the reinforcing member, which are positioned near each other.

2. Description of the prior art

For example, international application WO 96/15466 teaches an economic cable having the structure described above. The reinforcing member, the tube and the sheath are all of circular section. It appears that if this cable is curved the tube can be stressed in compression or in traction, according to the direction of the curvature. The skilled person is well aware that optical fibers must absolutely not be subjected to stress in traction. Any such stress increases the attenuation and reduces the lifetime of the fibers.

The present invention therefore consists in a cable comprising a housing in which optical fibers are disposed, this simple and economical cable having a structure such that the fibers are subjected to virtually no stresses if the cable is curved.

SUMMARY OF THE INVENTION

A fiber optic cable in accordance with the invention has a sheath, a housing provided in the sheath and in which the optical fibers are disposed and a single reinforcing member embedded in the sheath, the sheath, the housing and the reinforcing member having transverse axes situated on a common axis, wherein at least one of the component parts of the cable defined by the sheath, the housing and the reinforcing member has an oblong cross-section the greatest dimension of which is situated on the common axis, thereby constituting a neutral axis of preferential bending of the cable.

In this way a preferential curvature is imposed on the cable such that there is no stress on the longitudinal axis of the housing.

It follows that the optical fibers themselves are subjected to minimal stresses.

A circular section member has a plurality of neutral axes that coincide with the diameters of that section. The position of the neutral axis of a cable depends only on the shape, the stiffness and the arrangement of its various component parts. Accordingly, the structural design of a cable determines the location of its neutral axis. Note that the international application cited above does not provide any particular means of imposing a preferential curvature on the cable.

In a first embodiment of the cable of the invention the reinforcing member has an oblong section, the greatest dimension of the section defining the neutral axis of the cable.

In a second embodiment of the cable of the invention the housing has an oblong section, the greatest dimension of the section defining the neutral axis of the cable.

In the first and second embodiments the sheath is of circular section.

In a third embodiment of the cable of the invention the sheath has an oblong section, the greatest dimension of the section defining the neutral axis of the cable.

These three embodiments, which can be used individually, are naturally not mutually exclusive. It is possible to combine two of these modes in one and the same cable, or even to apply all three of them.

The reinforcing member can be made from a reinforced synthetic material or from metal, for example.

The housing is advantageously a tube, a micro-sheath or a void in the sheath.

The present invention will emerge in more detail from the following description of embodiments given by way of example with reference to the accompanying drawing.

DETAILED DESCRIPTION OF THE PREFERRED EMBODIMENTS

The cable of the invention essentially comprises three components, namely a housing such as a tube provided with optical fibers, a single reinforcing member, known also as the strength member, and a sheath. Given their inherent characteristics (shape, stiffness), the components of the cable are disposed so that the neutral axis of the cable corresponds to the neutral axis of the tube.

By "neutral axis" is meant a transverse axis about which the cable will curve naturally if is not constrained to curve about a different axis. When a cable follows a curved profile it will take up a position such that at any point of this profile the neutral axis is perpendicular to the plane containing the cable. The neutral axis of the cable corresponds to all of the points of the cable which are not stressed when the cable is curved. The neutral axis of the tube which shows the mean position of the optical fibers in the tube coinciding with the neutral axis of the cable, the mechanical stresses to which the fibers are subjected are at least minimized if they are not all eliminated.

Figure 1:
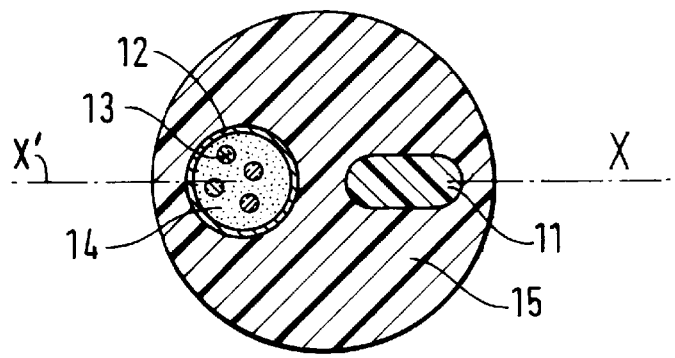
FIG. 1 shows a first embodiment of the cable of the invention.

Referring to FIG. 1, a first embodiment of the cable has a reinforcing member 11 of oblong section. The reinforcing member being assumed to have a stiffness greater than the other components of the cable, the greatest dimension of this oblong section determines the orientation of the neutral axis X'X of the cable. Here the tube 12 has a circular section. It is made from a plastics material such as a polyolefin or a thermoplastics material, a material that can be cross-linked or even of metal. The tube is provided with optical fibers 13 embedded in a conventional filler material 14. The extruded sheath 15 of the cable is also of circular section. The tube 12 having a circular section, any diameter of this section defines a neutral axis. The tube is therefore disposed in the cable so that a diameter of its section is aligned with the neutral axis X'X.

Figure 2:
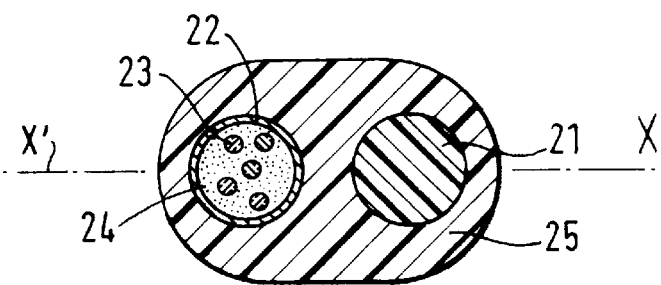
FIG. 2 shows a second embodiment of the cable of the invention.

In a second embodiment of the cable shown in FIG. 2 the neutral axis of the cable is imposed by the sheath of the cable. This sheath has an oblong or elongate section and, given the relatively large amount of material in the sheath 25, the greatest dimension of its section defines the neutral axis X'X of the cable. The reinforcing member 21, here of circular section, is arranged so that a diameter of its section is aligned with the neutral axis X'X. Likewise, as in the previous example, the tube 22 provided with fibers 23 and filler material 24 and also having a circular section is positioned so that a diameter of its section is aligned with the neutral axis X'X.

It is naturally possible to combine the above two embodiments by providing an oblong section reinforcing member 11 and a sheath 25 also of oblong section, the neutral axis X'X coinciding with the greatest dimension of the sections of the reinforcing member 11 and of the sheath 25 and with a diameter of the circular section of the tube 12, 22.

Figure 3:
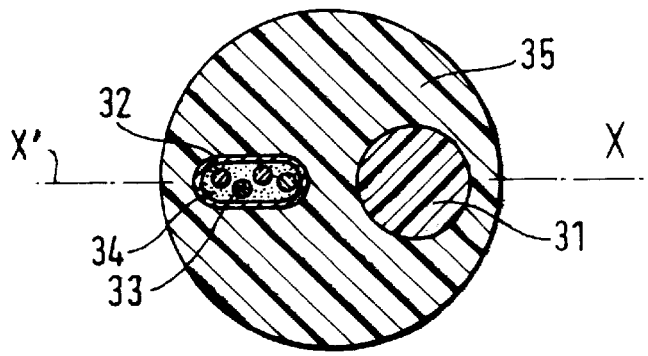
FIG. 3 shows a third embodiment of the cable of the invention.

FIG. 3 shows a third embodiment in which the tube 32 has an oblong section with the greatest dimension significantly greater than its smallest dimension. The tube 32 is again provided with optical fibers 33 coated with a filler material 34. Here, the reinforcing member 31 and the sheath 35 have a circular section. Given their respective stiffnesses, the dimensions of the tube, the reinforcing member and the sheath are determined so that the greatest dimension of the section of the tube 32 defines the neutral axis X'X of the cable with which diameters of the sections of the reinforcing member 31 and of the sheath 35 are aligned.

It is naturally possible to combine this third embodiment with either or both of the previous embodiments.

Firstly, if the reinforcing member 11 and the tube 32 are oblong in shape it is advantageous to align the greatest dimensions of the sections of these two components so as to define the neutral axis of the cable.

Secondly, if the reinforcing member 31 is circular and the tube 34 and the sheath 25 have an elongate section, it is desirable to align the greatest dimensions of the sections of the tube and of the sheath with a diameter of the section of the reinforcing member.

Thirdly, if the reinforcing member 11, the tube 34 and the sheath 25 each have an oblong section the cable is preferably in the shape of a ribbon in which the greatest dimensions of the three components are aligned.

Whichever embodiment is adopted, it is possible to reinforce the tube 12, 22, 32 by adding wicks to its external surface, for example glass or aramide wicks.

The tube 12, 22, 32 can be replaced by a micro-sheath in which the optical fibers are disposed without play. This micro-sheath is particularly fine and flexible.

Likewise, the tube 12, 22, 32 can simply be dispensed with, i.e. the fibers can be situated in a void formed in the sheath 15, 25, 35. This void corresponds in reality to the interior of the tube 12, 22, 32.

The invention therefore applies regardless of the form of housing in which the fibers are placed, i.e. whether this is a tube, a micro-sheath or a void.

It is therefore apparent that many solutions are available for implementing the invention and it is not possible to describe them all. The important point is that the structure of the cable be defined so that the neutral axis of the housing coincides with the neutral axis X'X of the cable.

There is claimed:

1. A fiber optic cable including a sheath, a housing provided in said sheath and in which said optical fibers are disposed and a single reinforcing member embedded in said sheath, said sheath, said housing and said reinforcing member having transverse axes situated on a common axis, wherein at least one of the component parts of said cable defined by said sheath, said housing and said reinforcing member has an oblong cross-section the greatest dimension of which is situated on said common axis, thereby constituting a neutral axis of preferential bending of said cable.

2. The cable claimed in claim 1 wherein said reinforcing member has an oblong section, the greatest dimension of said section defining the neutral axis of said cable.

3. The cable claimed in claim 1 wherein said housing has an oblong section, the greatest dimension of said section defining said neutral axis of said cable.

4. The cable claimed in claim 1 wherein said sheath has an oblong section, the greatest dimension of said section defining said neutral axis of said cable.

5. The cable claimed in claim 2 wherein said sheath has a circular section.

6. The cable claimed in claim 1 wherein said reinforcing member is made of a reinforced synthetic material.

7. The cable claimed in claim 1 wherein said reinforcing member is made of metal.

8. The cable claimed in claim 1 wherein said housing is a tube.

9. The cable claimed in claim 1 wherein said housing is a micro-sheath.

10. The cable claimed in claim 1 wherein said housing is a void in said sheath.

* * * * *